United States Patent
Williams et al.

(12) 
(10) Patent No.: US 6,192,045 B1
(45) Date of Patent: Feb. 20, 2001

(54) METHOD AND SYSTEM FOR MINIMIZING CONNECT-TIME CHARGES ASSOCIATED WITH DIAL-UP DATA NETWORKS

(76) Inventors: C. Wyatt Williams, 15005 Beacon Ridge Dr., Seneca, SC (US) 29678; Joel Libove, 34 Canyon View Dr., Orinda, CA (US) 94563

(*) Notice: Under 35 U.S.C. 154(b), the term of this patent shall be extended for 0 days.

(21) Appl. No.: 08/837,568

(22) Filed: Apr. 21, 1997

(51) Int. Cl.[7] .................................................. H04L 12/64
(52) U.S. Cl. ............................................ 370/352; 370/356
(58) Field of Search .................................... 370/352–356; 379/127, 142, 209

(56) References Cited

U.S. PATENT DOCUMENTS

| | | | |
|---|---|---|---|
| 4,876,717 | * 10/1989 | Barron et al. ............................ | 380/25 |
| 5,280,581 | * 1/1994 | Bathrick et al. ........................ | 395/200 |
| 5,303,301 | * 4/1994 | Takahata ................................ | 379/142 |
| 6,011,794 | * 1/2000 | Mordowitz et al. .................... | 370/389 |

OTHER PUBLICATIONS

Sears, Andrew, "The Effect of Internet Telephony on the Long Distance Voice Market", Internet Telephony Consortium, MIT, http://itel.mit.edu, pp. 1–10, Oct. 1996.*

* cited by examiner

*Primary Examiner*—Melvin Marcelo
(74) *Attorney, Agent, or Firm*—Eliot S. Gerber (57) ABSTRACT

A method to dynamically connect an originating computer to a receiving computer on a dial-up network, such as the Internet. The originating computer calls the receiving computer over the Public Service Telephone Network (PSTN); the receiving computer detects the call but does not answer it so that no PSTN charges are incurred; then both the receiving computer and originating computer call up the dial-up network and one of the computers obtains the network address of the other computer to establish a communication link between them.

17 Claims, 7 Drawing Sheets

FIG.1

| Recieving Computer | Phone Number | Data Network | Network Address |
|---|---|---|---|
| 1 | 510-385-1225 | Internet | 201.0.1.3 |
| 2 | 704-523-7721 | Internet | 69.0.0.4 |
| 3 | 803-733-2297 | AOL | //AOL/Case |
| 4 | 305-652-8859 | Lexus/Nexus | 13395322 |

FIG.2

| Valid ANI Phone Numbers | Data Network Type | Data Network Access Number |
|---|---|---|
| 305-652-8859 | DJIA Online Services | 232-1782 |
| 415-322-8322 | Internet | 235-8233 |
| 510-385-1225 | Compuserve | 232-3498 |
| 704-523-7721 | Internet | 235-8233 |
| 803-733-2297 | Internet | 235-8233 |

METHOD AND SYSTEM FOR MINIMIZING CONNECT-TIME CHARGES ASSOCIATED WITH DIAL-UP DATA NETWORKS

FIELD OF THE INVENTION

The present invention relates to computer data transmission and more particularly to the transmission of setup data over the Public Switched Telephone Network (PSTN) between geographically distant computers.

BACKGROUND OF THE INVENTION

The need to exchange data between computers has never been greater. For example, new demands on traditional Point-of-Sale applications require immediate (near real time) sales data to be transmitted from retail stores to their central office. Electronic Data Interchange (EDI)'s goal of paperless electronic commerce between customers and suppliers requires that computers be able to exchange order and payment information 24 hours a day. And multinational corporations with offices around the world need to be able to exchange files, send faxes, and conduct voice and multimedia sessions with employees at any time of day for minimal cost.

Existing methods for exchanging data (including fax and voice) between two geographically distant computers or fax machines utilize (1) dial-up point-to-point connections over the Public Switched Telephone Network (PSTN); (2) dedicated transmission connections (also known as private lines or leased lines); and (3) dial-up data network connections, like the Internet. Method 1 requires one computer to initiate a data exchange with the other by using the PSTN to establish a long distance phone call during which the two computers exchange data. This Method 1 is cost effective for weekly or monthly exchanges of small amounts of data. However, it is undesirable for lengthy data transfers, due to the toll time charges associated with long-distance phone calls.

Method 2 utilizes dedicated transmission lines between two computers for exchanging data. For frequent exchanges of large amounts of data, Method 2 is more cost effective than Method 1 but typically requires a fixed monthly payment for the dedicated transmission line, regardless of the amount of data exchanged. As with Method 1, the computers are able to exchange data at any time, although dedicated transmission lines do not incur the overhead or delay associated with Method 1.

Method 3, using dial-up data networks, like the Internet, to transfer data, improves upon Methods 1 and 2 since there are (typically) no long-distance fees associated with connecting to the Internet. Another benefit is that Internet Service Providers (ISP) provide access to the Internet at rates significantly lower than the rates for dedicated transmission lines.

For two computers to exchange data over the Internet at any time, they must be connected to the Internet 24 hours a day or connected at predetermined times, or use a person at one computer to place a telephone call to a person at the other computer to tell him/her to become connected with the Internet. Unfortunately, when the data transferred is infrequent and/or small in size, the cost of 24-hour connection to the Internet can be greater than the costs associated with a direct point-to-point connection over the PSTN between the two computers. And connecting at predetermined times precludes the transmission of real-time or near real-time data and does not provide any flexibility, for example, if heavy data traffic slows the communication.

A more cost effective method would combine the best features of Methods 1 and 3 to allow data transfers over the Internet, but not require that both computers maintain a 24-hour connection to the Internet or rely on a predetermined connection schedule. It would be ideal if there were a way that both computers would automatically, without human intervention, be able to connect to the Internet only when data exchange is required so that connect-time charges would be kept to a minimum.

SUMMARY OF THE INVENTION

The present invention seeks to minimize the costs of exchanging data over geographically separate computers and fax (facsimile) machines. It provides such cost savings by enabling two computers to use dial-up data networks ("network"), like the Internet, to exchange data and enabling them to dynamically connect to the Internet only when there is a need to transfer data by using a "callback" mechanism. At all other times, the computers are not connected to the network.

When one computer (the "originating" computer) determines the need to exchange data with another computer (the "receiving" computer) it uses a preconfigured mapping table to obtain the phone number associated with the receiving computer. The originating computer connects to the PSTN via a modem and dials the receiving computer's phone number, allowing the receiving computer to receive several ring pulses. The originating computer then terminates the unanswered phone call and proceeds to dial a phone number to establish a dial-up connection to the data network associated with the receiving computer. Once connected, it establishes a connection with the receiving computer. The receiving computer, by this time, has dialed up and been connected to the same data network. All of these steps are programmed in the two computers and are performed without human intervention.

When the receiving computer detects an incoming phone call on its modem, it extracts the Automatic calling Number Identification (ANI) information. ANI is generated by the local exchange carrier using in-band signaling to transmit information, between the ring pulses, such as the calling party's phone number and name. This is not a standard feature for phone service. A monthly fee is normally levied to allow the receiving party to obtain ANI information. Consequently, the receiving computer must arrange with its local telephone company for ANI service.

The receiving computer uses the originating computer's phone number, contained in the ANI information, to determine how to respond to the incoming, and as yet, unanswered phone call. If the receiving computer does not "recognize" the phone number as one from a list of originating computers' phone numbers, it can answer the phone call. This allows the computer to respond appropriately to normal phone call requests to establish a point-to-point dial-up connection for data transfer or to answer an incoming fax, or to allow an individual to answer a voice call.

If the receiving computer recognizes the phone number (it is on the list) it does not answer the phone call. The incoming phone call is then terminated, by the originating computer, preferably after two rings. The receiving computer records, in its memory, an identification of the originating computer and the data network associated with the obtained ANI information. It dials a phone number to its Internet Service Provider to establish a dial-up connection to the data network. The receiving computer is connected with the originating computer through the data network. If the network is the Internet one computer is connected to the other using the identification of the IP address. When the computers have finished exchanging data, they disconnect.

This novel use of ANI, using it to synchronize two computers to become simultaneously connected to the same dial-up data network, provides a clear advantage over a 24-hour connection, since connect-time charges are accrued only when data is exchanged—once data transfer has been completed the computers disconnect from the network. Similarly, the receiving computer's use of ANI to determine when to dial-out results in reduced connect-time charges (compared to not using ANI and dialing-out with each incoming phone call). Also, ANI allows the receiving computer to connect to different data networks based on the originating computer—a system that did not use ANI would not be able to distinguish between originating computers and would always call the same data network. Finally, ANI provides the capability for non-callback-type calls to be processed conventionally, i.e., allows the establishment of a normal point-to-point dial-up connection, fax reception, or voice call (for shared phone lines).

In areas that do not have ANI support, and for incoming calls that do not convey ANI information (international calls, for example), another means to inform a receiving computer to connect to a particular data network is to use distinctive ring service. This service, commonly available from local phone companies, assigns a secondary phone number to an existing phone line. When a calling party initiates a phone call using the primary phone number, the ringing signals at the receiving end are normal (a single ringing tone). When the calling party initiates a phone call using the secondary number, a distinctive ring occurs (a double ringing tone). This technique is particularly useful for routing international fax calls using a fax callback device situated between the PSTN and a fax machine. When a non-distinctive ring is detected by the fax callback device, the fax call is routed directly to the fax machine, but when a distinctive ring is detected the incoming call is not answered. Instead, after the incoming call ends, the fax callback device connects to a predetermined data network in order to receive the fax transmission. Once the transmission is completed, the fax callback device disconnects from the data network.

In telephone calling areas that do not have ANI or distinctive ring support, an alternative means of conveying the originating computer's identity without incurring PSTN-related charges is to take advantage of a short "no-charge" window that occurs at the beginning of every phone call. This window is an anomaly of the PSTN and allows up to a one second "free" connection to be established. To take advantage of this window, as soon as the originating computer detects that the receiving computer has answered the call, it immediately terminates the connection without sending any information. When this quick hang-up is detected by the receiving computer, the receiving computer connects to a predetermined network to exchange data with the originating computer. If, when the receiving computer answers the call, the call is not immediately terminated, then the incoming phone call is handled normally.

The present invention in its simplest form does not require that the receiving computer use ANI, distinctive ring or the above-mentioned no-charge window. If the receiving computer is only required to connect to a single predetermined data network, and if there is no requirement for non-callback-type calls to be processed then they may be eliminated. In this case the originating computer disconnects ("hangs up") after the first ring. The receiving computer, based on the signal of a single ring, will dial-up its predetermined network. The originating computer, after disconnecting from the PSTN after one (or two) rings, will also dial-up the same network so that the two computers can exchange data.

There have been suggested in the patent literature various methods for a client computer to initiate callback service from a server computer, see U.S. Pat. No. 4,876,717 and Bathrick et al U.S. Pat. No. 5,280,581. But in these patents the callback occurs only after the server computer has answered the incoming phone call and established the identity of the client computer via log-in with a password or other authentication process. Only after the authentication is established does the server computer (or another server computer) initiate a phone call to the pre-established (or just transmitted) phone number where the client computer is located. Also, in these patents, the callback is always back to the client computer and not to a dial-up network, such as the Internet. In addition, PSTN-related charges are incurred during authentication.

Other patents provide call forwarding capability, where the incoming phone call is forwarded to another phone number. This forwarding can occur before the incoming call has been answered or after the caller has transmitted data to the forwarding device. Finally, the telephone exchange described by Martens U.S. Pat. No. 5,329,572 provides a service that is similar to this invention but with several key differences. Martens describes how a "customer" requires a connection between two DTE (Data Terminal Equipment) devices; however, the connection request in this invention comes from one of the devices that is to participate in the connection. Also, Martens requires communication with an interoffice communication network that establishes the connection between the separate DTEs on the separate exchanges—this invention has no requirement for such an intermediary.

The present invention is particularly well-suited to serving (providing) on-demand data over the Internet. Such applications on the Internet are as diverse as serving data files for World Wide Web pages, providing on-demand real-time video images, transmitting faxes, providing telemetry data showing the status of a remote site at which the receiving computer is located, and two-way voice and image communication using computers as two-way voice and image transmitters and receivers. The present invention allows such data to be made immediately available to the data network by the server (originating computer) without the necessity and expensive of having the client (receiving computer) be connected to the network at any other time.

An advanced embodiment of the present invention enables multiple receiving computers to be employed. When one receiving computer is busy on the data network, incoming calls are redirected, using standard features of the PSTN such as busy-call-forwarding or rollover, to an alternate server (receiving computer) connected to a second phone line. This can further be extended so that while this second server is occupied, any further incoming calls can be forwarded to a third server, and so on. In this way, for example, a small company with a plurality of phone lines, each connected to a separate receiving computer, can inexpensively implement a small farm of web servers that are collectively capable of handling a high volume of requests for data files. This "farm" can either be a group of servers in the same building or alternatively may be spread over many buildings, without the need for the servers to have any communication with each other, other than their connection to the common PSTN.

In larger corporations, the originating computer may actually consist of several computers connected over a local area network. For example, one computer could be used to signal the receiving computer over the PSTN while a different computer might make the actual dial-up connection to the data network. The signaling computer could notify the dial-up computer over the LAN to indicate the appropriate data network to which it needs to connect. The same is true at the receiving end: the receiving computer may consist of one computer used to receive the PSTN connection request while a different computer, connected over a LAN, makes the dial-up connection to the data network.

BRIEF DESCRIPTION OF THE DRAWINGS

The inventor's presently known best mode of practicing the present invention is described in the following detailed description, which should be considered in conjunction with the accompanying drawings.

In the drawings.

DETAILED DESCRIPTION

Figure 1:
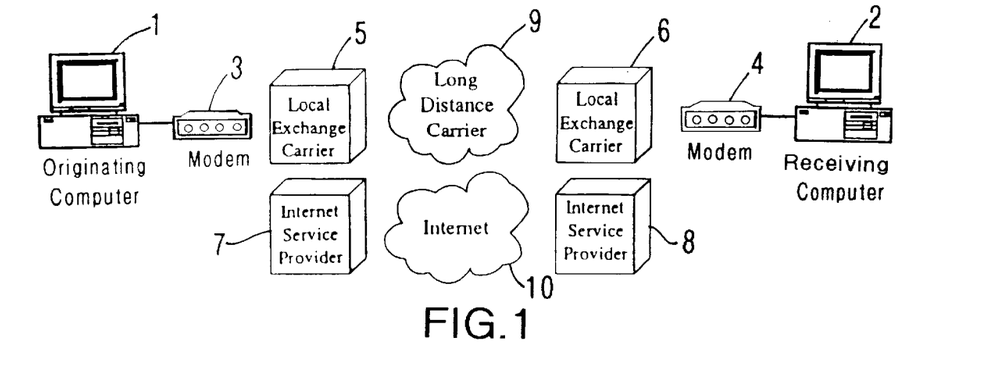
FIG. 1 is a block diagram which illustrates the normal, unconnected state of the originating and receiving computers.
Figure 2:
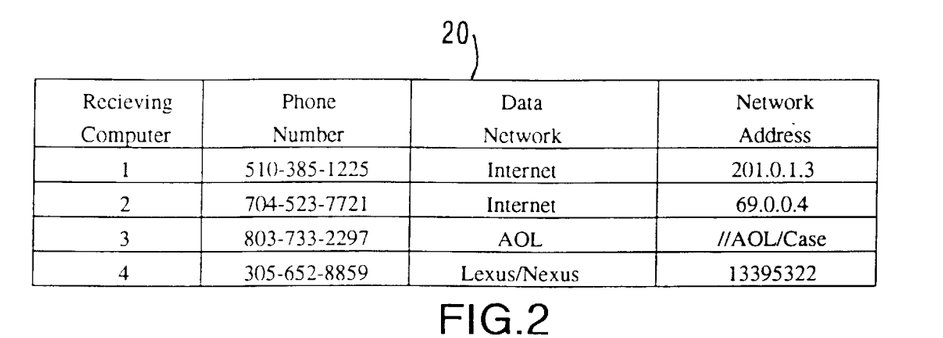
FIG. 2 illustrates typical entries in the initiating computer's receiving computer contact table, a database.

As shown in FIG. 1, when originating computer 1 determines the need to transfer data to a receiving computer 2, as indicated in decision block 30 (FIG. 4), it obtains the phone number of that computer from a table (see FIG. 2) which maps receiving computers 2 to phone numbers, as indicated in block 31. originating computer 1 uses an attached (or integral) modem 3 to establish a connection 11 (FIG. 5) to local exchange carrier (LEC) 5 by going off-hook. It then transmits signaling tones to LEC 5 corresponding to the phone number of receiving computer 2 as indicated in block 32. LEC 5 establishes connection 13 via a long-distance carrier 9 (LDC) to the LEC 6 located near the receiving computer 2.

Figure 4:
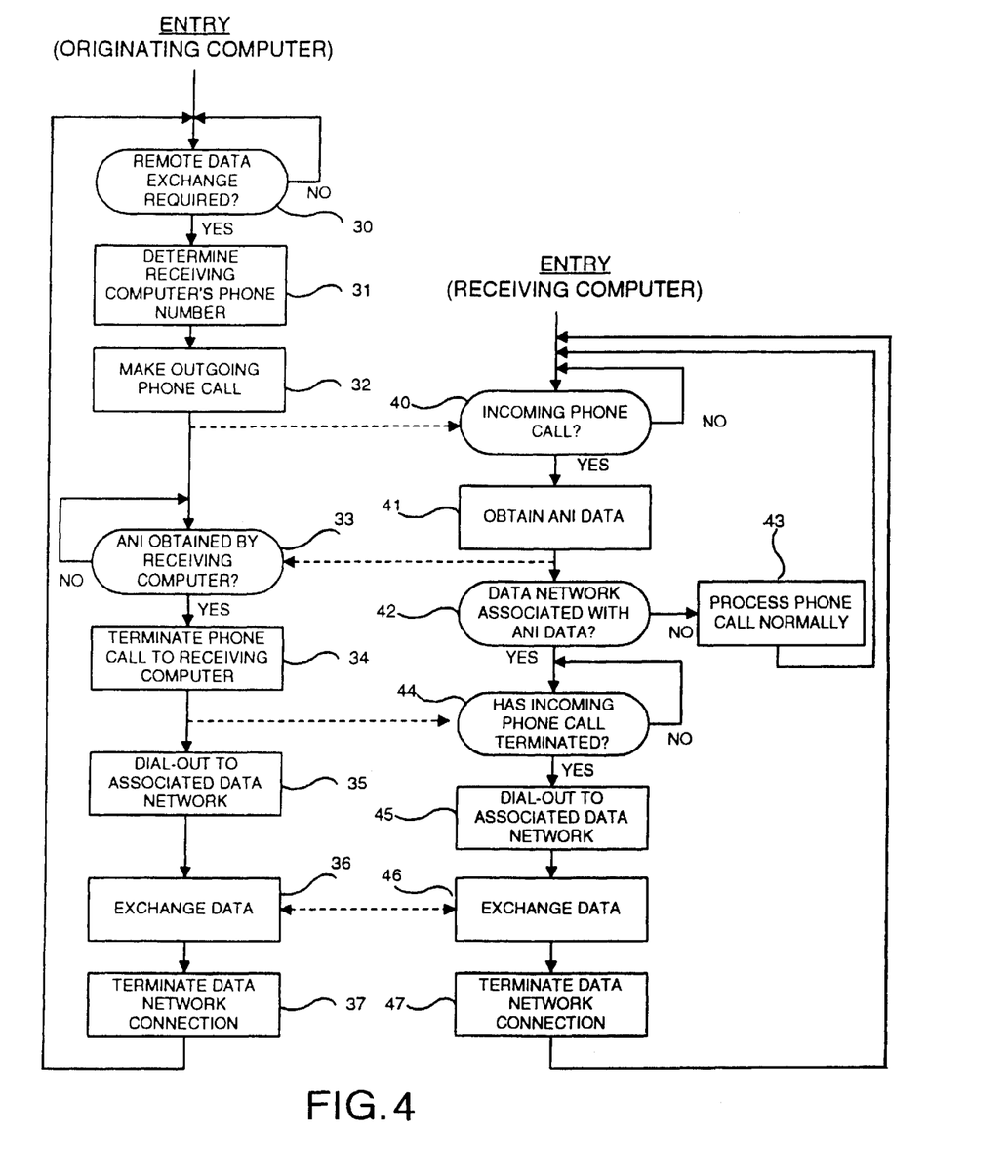
FIG. 4 is a flow chart identifying the processing blocks of the initiating computer and the receiving computer and the interaction between them.
Figure 5:
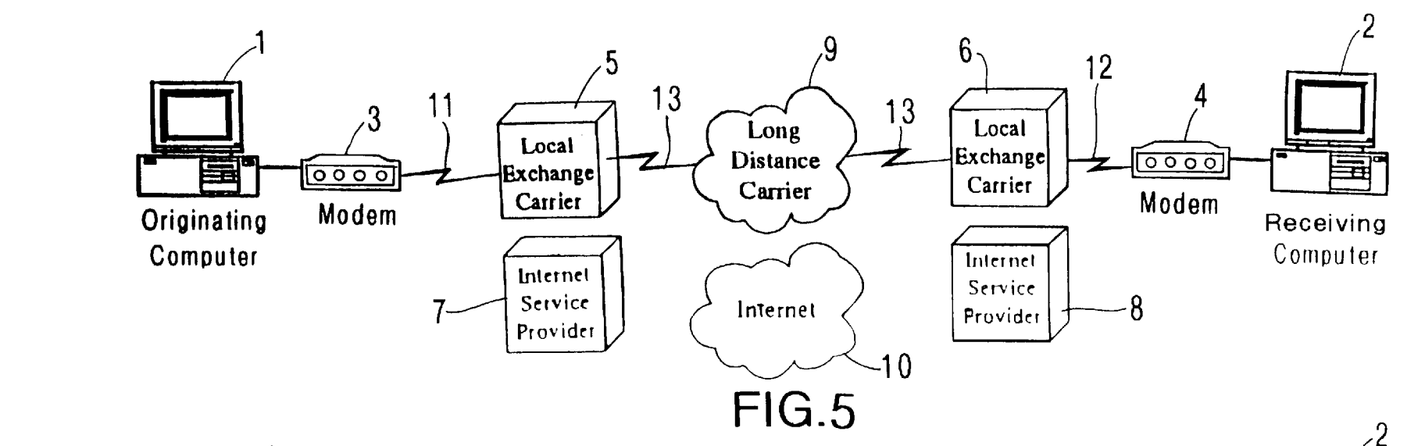
FIG. 5 is a block diagram which illustrates a transient PSTN connection between the originating and receiving computers used for signaling the receiving computer.

LEC 6 signals modem 4 attached to the receiving computer 2 of the incoming phone call 12 by generating a ringing signal and transmitting ANI information. After receiving computer 2 has had time to detect the incoming phone call 12, as indicated in decision block 40, and extract the ANI information, as indicated in block 41, originating computer 1 waiting in decision block 33 terminates the phone call, as indicated in block 34.

Figure 6:
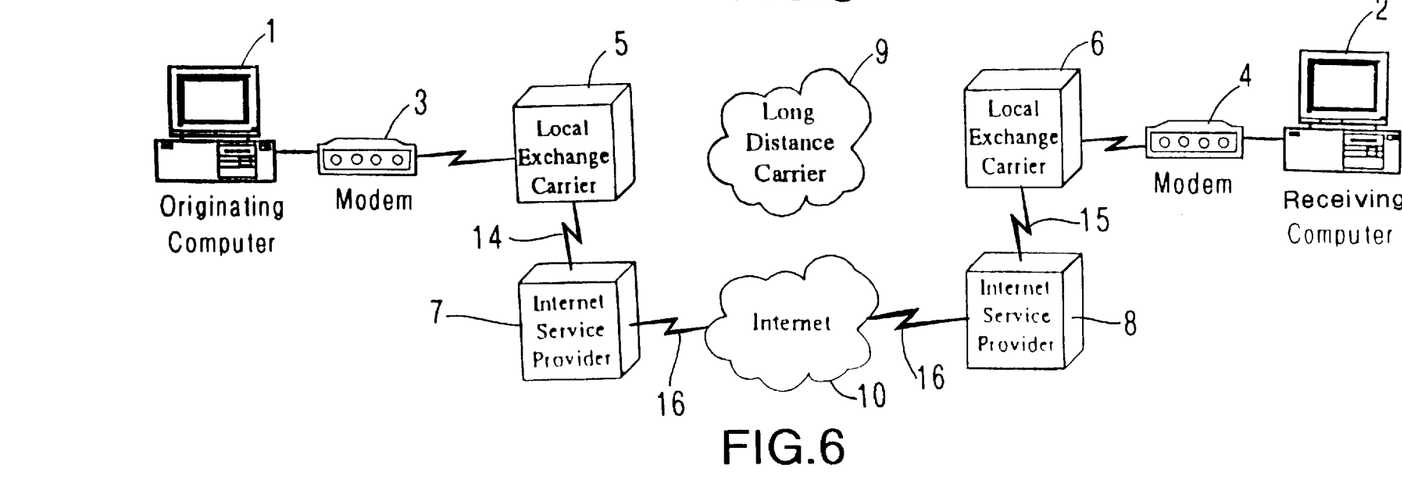
FIG. 6 is a block diagram which illustrates an established Internet connection by the originating and receiving computers.

As shown in FIG. 6, originating computer 1 next uses an attached (or integral) modem 3 to establish a connection 11 to local exchange carrier (LEC) 5 by going off-hook. It then transmits signaling tones to LEC 5 corresponding to the phone number of its Internet Service Provider (ISP) 7 as indicated in block 35. LEC 5 establishes a connection 14 to ISP 7 which then establishes connection 16 to the Internet. Originating computer 1 is now connected to Internet 10 and is ready to exchange data, as indicated in block 36.

Figure 3:
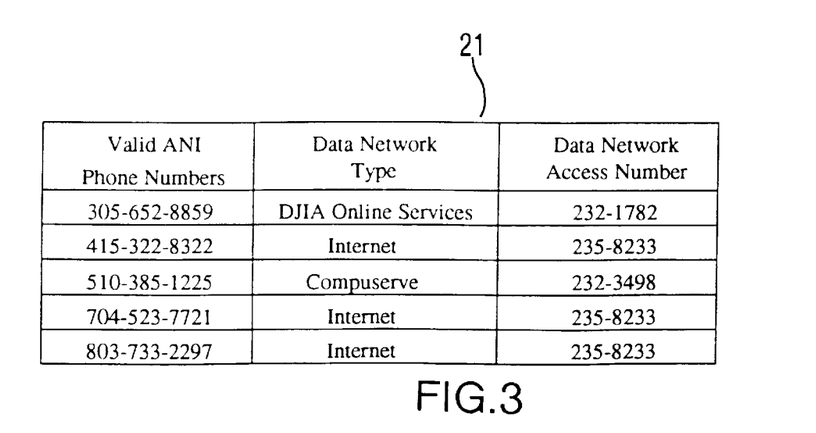
FIG. 3 illustrates typical entries in the receiving computer's connection request table, a database.

As shown in FIG. 5, when modem 4 detects an incoming phone call 12 from LEC 6, it alerts receiving computer 2, waiting in decision block 40, which requests and receives the ANI information from modem 3, as shown in block 41. Receiving computer 2 then accesses mapping table 21, such as the table illustrated in FIG. 3, to determine if the phone number obtained from the ANI information is contained in mapping table 21, as indicated in decision block 42. If the phone number is not found in table 21, receiving computer 2 will process the phone call normally as indicated in block 43.

If the phone number is found in mapping table 21, receiving computer 2 does not answer the incoming phone call; but waits for phone call 12 to be terminated by originating computer 1 as shown in decision block 44. As shown in FIG. 6, once call 12 has terminated, receiving computer 2 uses attached (or integral) modem 4 to establish a connection 12 to local exchange carrier (LEC) 6 by going off-hook. It then transmits signaling tones to LEC 6 corresponding to a phone number associated with the received ANI information as indicated in block 45, and in this example, connects to receiving computer 2's Internet Service Provider (ISP) 8. LEC 6 establishes a connection 16 to Internet 10 via ISP 8. Receiving computer 2 is now connected to Internet 10 and is ready to exchange data as indicated in block 47.

When originating computer 1 and receiving computer 2 have completed exchanging data, originating computer 1 uses attached modem 3 to terminate the phone call to LEC 5, as indicated in block 37, and receiving computer 2, in block 47, uses attached modem 4 to terminate the phone call to LEC 6. The originating computer returns to the state indicated by block 30 and the receiving computer returns to the state shown by block 40, that state being illustrated in FIG. 1.

In cases where a main server (the originating computer 1) needs to distribute data to many receiving computers 2, it is more efficient for the originating computer to remain connected to the Internet 10 for 24-hours a day. In this case, the originating computer 1 signals the remote computer 2 and waits for the remote computer 2 to connect to Internet 10. When the receiving computer 2 has connected, they exchange data. Once completed, the receiving computer 2 disconnects from Internet 10 while originating computer 1 does not disconnect from Internet 10, but remains connected and begins the same process over again for a different receiving computer.

First Alternative Embodiment of the Invention

Figure 7:
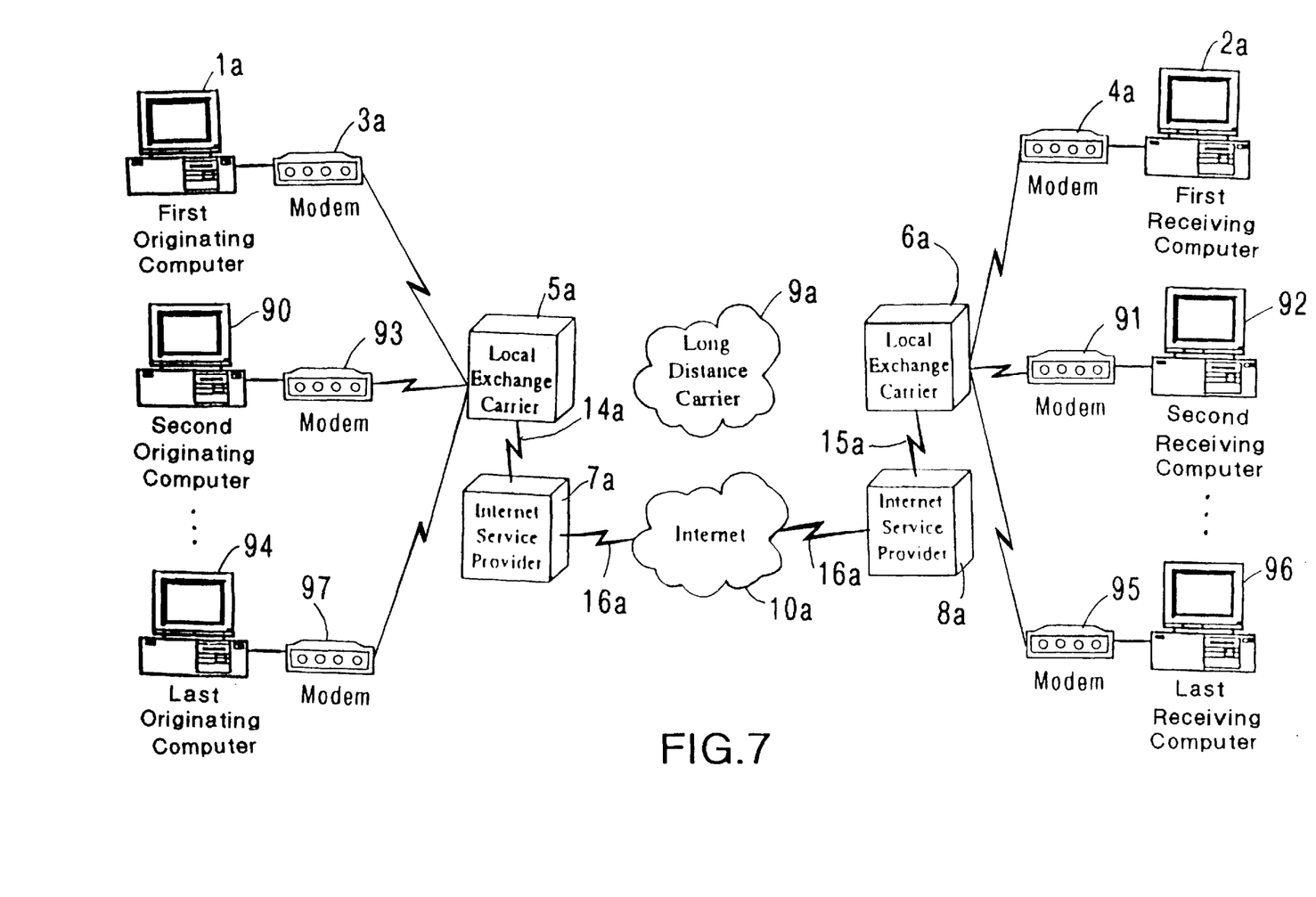
FIG. 7 is a block diagram which illustrates the first alternative embodiment controlling communication between three, or more, computers.

FIG. 7 illustrates an alternate embodiment in which a plurality of receiving computers are each connected to the PSTN and data network through a separate connection accessible by dialing a telephone number that is unique to each particular receiving computer.

When originating computer 1a, shown in FIG. 7, determines the need to transfer data to a receiving computer 2a, it obtains the phone number of that computer from a table (see FIG. 2) that maps receiving computers 2a to phone numbers. Originating computer 1a uses an attached (or integral) modem 3a to establish a connection 11a to local exchange carrier 5a (LEC) by going off-hook. It then transmits signaling tones to LEC 5a corresponding to the phone number of receiving computer 2a, as indicated in block 32. LEC 5a establishes a connection 13a via a long distance carrier 9a (LDC) to the LEC 6a located near the first receiving computer 2a.

LEC 6a signals modem 4a attached to first receiving computer 2a of the incoming phone call 12a by generating a ringing signal and transmitting ANI information. After first receiving computer 2 has had time to detect the incoming phone call 12 and extract the ANI information, first originating computer 1a terminates the phone call.

Next originating computer 1a uses an attached (or integral) model 3a to establish a connection 11a to local exchange carrier (LEC) 5a by going off-hook. It then transmits signaling tones to LEC 5a corresponding to the phone number of its Internet Service Provider (ISP) 7a, as indicated in block 35. LEC 5a establishes a connection 14a to ISP 7a which then establishes connection 16a to the Internet. First originating computer 1a is now connected to Internet 10a and is ready to exchange data.

When modem 4a detects an incoming phone call 12a from LEC 6a it alerts first receiving computer 2a which requests and receives the ANI information from modem 8a. Receiving computer 2a then accesses mapping table 21 such as the one illustrated in FIG. 3 to determine if the phone number obtained form the ANI information is contained in mapping table 21. If the phone number is not found in table 21, then receiving computer 2a processes the phone call normally.

If the phone number is found in mapping table 21, then receiving computer 2a does not answer the incoming phone call but waits for phone call 12a to be terminated by originating computer 1a. Once call 12a has terminated, receiving computer 2a uses attached (or integral) modem 4a to establish a connection 12a to local exchange carrier (LEC) 6a by going off-hook. It then transmits signaling tones to LEC 6a corresponding to phone number associated with the received ANI information as indicated in block 45 and, in this example, connects to receiving computer's 2a Internet Service Provider (ISP) 8a. LEC 6a establishes a connection 16a to Internet 10a via ISP 8a. Receiving computer 2a is now connected to Internet 10a and is ready to exchange data as indicated in FIG. 6. Receiving computer 2a holds its connection to LEC 6a off-hook until it has finished exchanging data.

While receiving computer 2a is connected to Internet 10a a second originating computer 90 desires to establish a connection with receiving computer 2a, it performs the same steps that the first originating computer 1a used. However, when the PSTN attempts to connect to the phone number where modem 4a resides, the PSTN system finds that this line is busy and it then dials a second number where modem 91 resides, connected to a second receiving computer 92 having duplicate data to that of first receiving computer 2a. This dialing of said second number is a standard feature available almost universally in the PSTN. It is commonly known as busy-call-forwarding, or when used in a PBX or local system such as Centrex, it is known as rollover. In either case, the second number has been previously programmed into the PSTN so that it would automatically be called if the first number was busy.

Then, in a manner similar to that in which originating computer 1a established the network connections to exchange data with receiving computer 2a, the second originating computer 90 establishes the network connections to exchange data with the second receiving computer 92. When this is accomplished, receiving computer 92 and originating computer 90 are connected to the Internet and exchanging data, as a completely independent and parallel activity to that of receiving computer 2a and originating computer 1a.

When originating computer 1a and receiving computer 2a have completed exchanging data, originating computer 1a uses attached modem 3a to terminate the phone call to LEC 5a and receiving computer 2a uses attached modem 4a to terminate the phone call to LEC 6a. The originating computer returns to the state indicated by block 30 and the receiving computer returns to the state shown in block 40, as illustrated in FIG. 1.

Similarly, when second originating computer 90 and second receiving computer 92 have completed exchanging data, second originating computer 90 uses attached modem 93 to terminate the phone to LEC 5a and second receiving computer 92 uses attached modem 91 to terminate the phone call to LEC 6a.

It can readily be seen to those skilled in the art that said forwarding means can be extended to a system having many more than two receiving computers, and in this way a very high volume of requests for service may be handled in parallel.

Second Alternative Embodiment of the Invention

Figure 9:
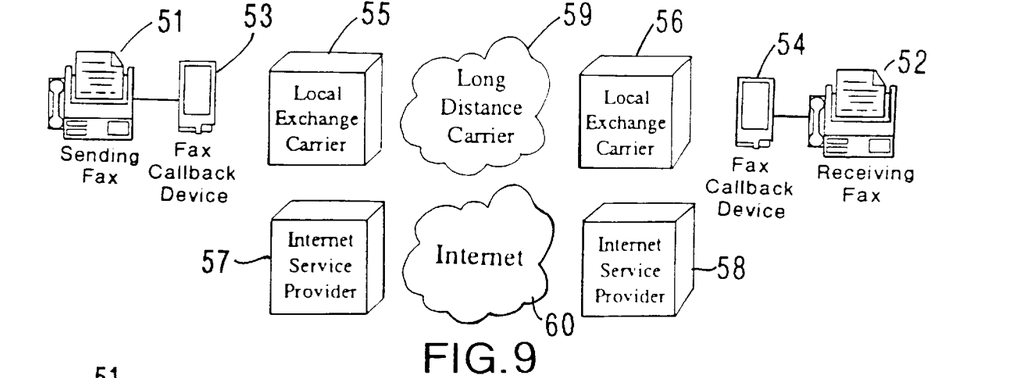
FIG. 9 is a block diagram which illustrates the normal, unconnected state of the originating and receiving fax call-back devices.
Figure 10:
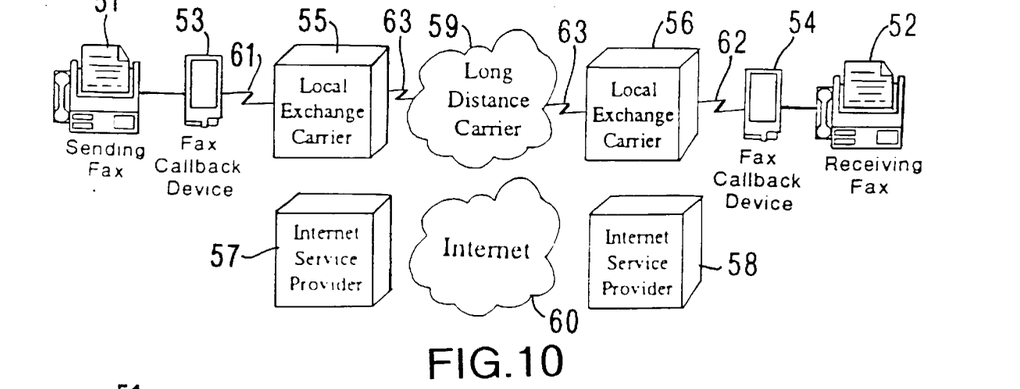
FIG. 10 is a block diagram which illustrates a transient PSTN connection between the originating and receiving fax callback devices used for signaling the receiving callback devices.
Figure 12:
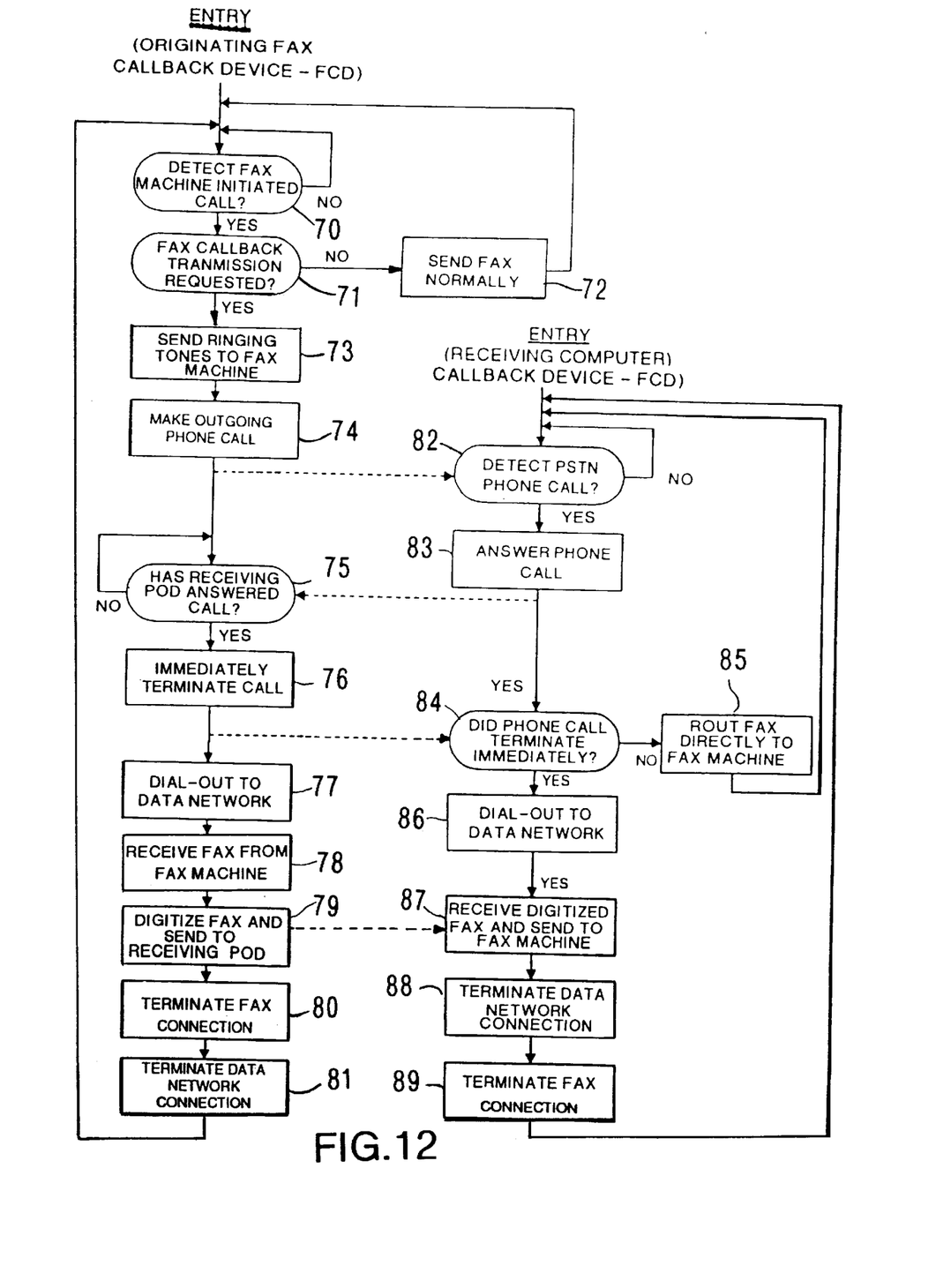
FIG. 12 is a flow chart identifying the processing blocks of the fax machine and fax call-back device system of FIGS. 9–11.

When a user wants to send a fax over the Internet, he adds a special code (such as **2) to the phone number of the receiving fax machine 52. When sending fax machine 51, shown in FIG. 9, initiates sending the fax, the attached fax call-back device 53 detects the special code and intercepts the call, as shown in blocks 70 and 71 (FIG. 12). Fax call-back device 53 begins the call-back sequence by sending ringing signals to sending fax machine 51 so that it appears that the connection is proceeding normally, as indicated in block 73. Next, fax call-back device 53 establishes a connection 61 to local exchange carrier (LEC) by going off-hook, as shown in FIG. 10. It then transmits signaling tones received from sending fax machine 51 to LEC 55 corresponding to the phone number of receiving fax machine 52, as indicated in block 62. LEC 55 establishes a connection 63 via a long distance carrier 59 (LDC) to the LEC 56 located near the receiving fax machine 52.

LEC 56 signals fax callback device 54 attached to receiving fax machine 52 of the incoming phone call by generating a ringing signal. Waiting in block 82, fax call-back device 54 answers the incoming phone call 62 (block 83) and waits to see if incoming phone call 62 is immediately terminated as shown in block 84. Sending fax callback device 53, waiting in block 75, detects that fax callback device 54 has answered incoming phone call 62 and immediately terminates phone call 61, as shown in block 76, to avoid any PSTN-related charges.

If fax call-back device 54 detects that an incoming phone call 62 from LEC 56 was not immediately terminated, fax call-back device 54 routes the incoming phone (fax) call 62 to receiving fax machine 52, as indicated in block 85, which receives and processes the fax normally, as indicated in block 43.

Figure 11:
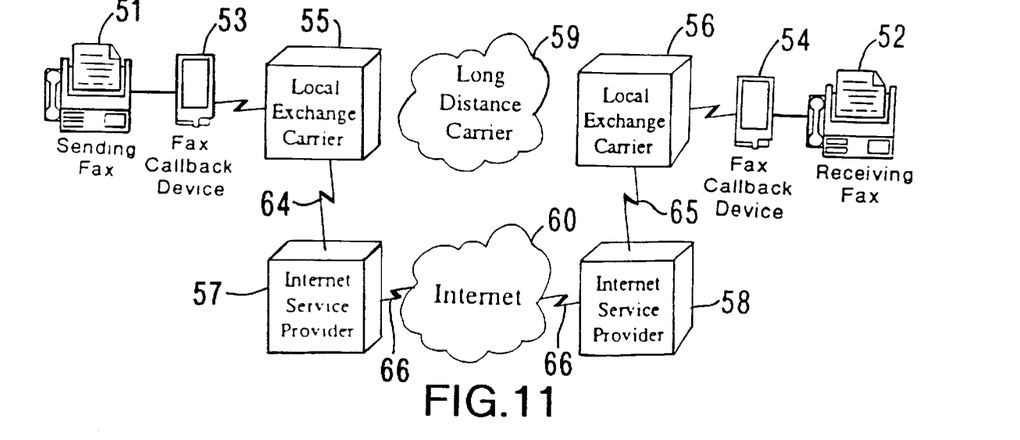
FIG. 11 is a block diagram which illustrates an established Internet connection by the originating and receiving fax callback devices.

If incoming phone call 62 from LEC 56 was immediately terminated, then, once call 62 has terminated, fax call-back device 54 establishes a connection 62 to local exchange carrier (LEC) 56 by going off-hook. It then transmits signaling tones to LEC 56 corresponding to a preprogrammed phone number associated with the immediately terminated call, and in this example connects to fax call-back device's 54 Internet Service Provider (ISP) 58. LEC 56 establishes a connection 66 to Internet 60 via ISP 58. Fax call-back device 54 is now connected to Internet 10 and is ready to receive the fax as indicated in block 87 and FIG. 11.

Next attached fax call-back device 53 establishes a connection 61 to local exchange carrier (LEC) 55 by going off-hook. It then transmits signaling tones to LEC 55 corresponding to the phone number of its Internet Service Provider (ISP) 57 as indicated in block 65. LEC 55 establishes a connection 64 to ISP 57 which then establishes connection 66 to the Internet. Sending fax machine 51 is now connected to Internet 60 and is ready to transmit the fax, as indicated in block 79 and FIG. 11.

When fax call-back device 53 has finished receiving the fax from sending fax machine 51, it terminates the connection with sending fax machine 51 as shown in block 80, by going on-hook. After completed transmission of digitized fax data to fax call-back device 54, fax call-back device 53 terminates the phone call 61 and 66 to Internet 60 by going on-hook, as indicated in blocks 80 and 81 and returns to the state shown by block 70 and in FIG. 9.

When fax call-back device 54 has finished receiving the fax from fax call-back device 53, fax call-back device 54 (in block 87), it terminates phone call 62 and 65 to the Internet 60 by going on-hook, as indicated in block 88. After fax call-back device 54 has completed transmission of received fax to fax machine 52, fax call-back device 54 terminates the connection by going on-hook, as indicated in blocks 89, and returns to the state shown by block 82 and in FIG. 9.

Figure 8:
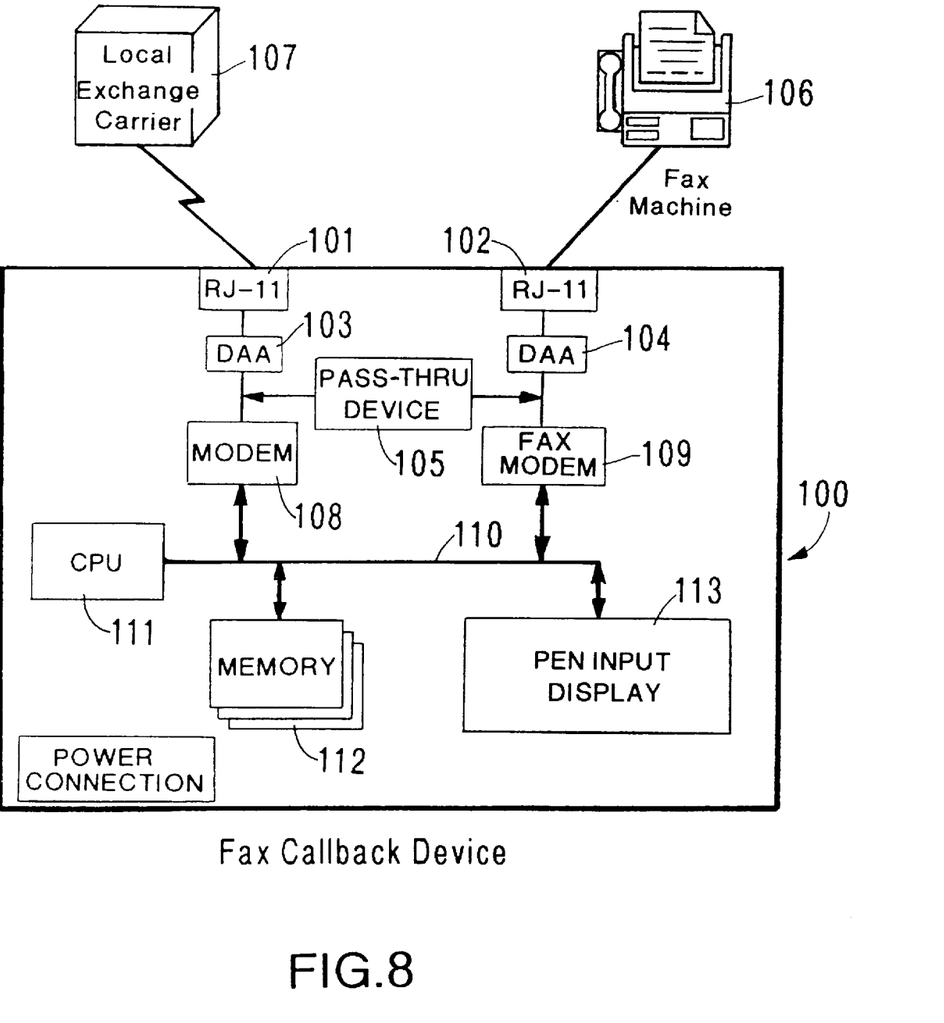
FIG. 8 is a block diagram of the novel fax call-back device.

A preferred fax call-back device 100 is shown in FIG. 8. It includes telephone line jack ports 101 and 102 (RJ-11 ports) each of which is connected to a Data Access Arrangement (DAA) 103,104. A pass-thru device 105 connects the fax machine 106 to the Local Exchange Carrier (LEC) 107 in the event the call is from a non-call-back type device. The DAA 103 is connected to a 28.8 baud modem 108 and the DAA 104 is connected to a 14.4 baud fax modem 109. The modems 108,109 are connected to bus 110. Also connected to the bus 110 are the following components: CPU 11, for example, Intel 486SX-33; Memory 112, for example, 2 Meg bytes; and 480×240 Pixel Pen/Touch screen display 113. The Pen Input Display, for example, operated with a plastic stick, provides a display of the numbers entered by the user. Alternatively, the device 100 may use a numerical keyboard and a display.

In the claims the term "computer" means a programmable digital computer or the combination of a fax machine and a call-back device. The phrase "PSTN-related charges" means charges that are incurred above and beyond normal base service charges for phone service and, in particular include per call related charges.

What is claimed is:

1. The method for dynamic connection of an originating computer and a receiving computer to the same dial-up network, the steps to be performed automatically by the computers under program control, the steps being:
   (a) the originating computer places a telephone call to the receiving computer over the Public Service Telephone Network (PSTN);
   (b) having the receiving computer detect an incoming call being telephoned over PSTN and generating a control signal in response to said detection and not answering the incoming call;
   (c) the originating computer hangs up (hooks) the PSTN call prior to incurring PSTN-related charges;
   (d) automatically in response to the control signal, the receiving computer dials-up a dial-up network using a predetermined generally unchanging phone number;
   (e) the originating computer automatically dials-up or maintains communication with the same dial-up network; and
   (f) one of the computers uses the dial-up network to obtain the network address of the other computer and establishes a link over the dial-up network to said other computer.

2. The method of claim 1 wherein the computers are general purpose digital computers and the computers perform the steps (a)–(e) under software programming control.

3. The method of claim 1 wherein at least one of the computers is a combination of a fax machine and a stand-alone call-back device connected to the fax machine, wherein the originating computer performs step (a) and (c) and (e) and the stand-alone device performs steps (b) and (d).

4. The method as in claim 1 wherein in step (d) the receiving computer and in step (e) the originating computer dials-up a predetermined network without the receiving computer determining an identification of the originating computer.

5. The method of claim 1 and detecting a signal from in-band signals of the originating computer while the receiving computer is on-hook.

6. The method of claim 1 and including a plurality of receiving computers where at least one performs step (b) and at least a different one performs step (d).

7. The method of claim 1 wherein in steps (d) and (e) the computers dial-up the Internet.

8. The method of claim 1 and including a plurality of originating computers where at least one performs steps (a) and (c) and at least a different one performs steps (e) and (f).

9. A method for the dynamic connection of an originating computer and a receiving computer to the same dial-up data network, the method including the steps of:
   (a) said originating computer requesting a connection, using a dial-up means, over Public Service Telephone Network (PSTN) to the receiving computer;
   (b) said receiving computer detecting a connection request from said PSTN using a detecting means and not answering the incoming call;
   (c) said originating computer using means to convey information to said receiving computer without incurring PSTN-related charges;
   (d) said receiving computer using a receiving means to receive the information from said originating computer;
   (e) said receiving computer using a processing means and a databank to determine that the received information associates the originating computer with a particular data network;

(f) said receiving computer, automatically, after receiving said received information, using dial-up means for establishing a connection over the PSTN to the derived data network;

(g) said originating computer, after conveying said information, automatically using said dial-up means for requesting a new connection over the PSTN or maintains communication to the same derived network.

10. The method according to claim 9 and in (c) using in-band signaling that occurs while said receiving computer is on-hook to convey the information.

11. A system for dynamic connection of an originating computer and a receiving computer to the Internet, to be performed automatically by the computers under program control, comprising:

(a) PSTN call means at the originating computer to place a telephone call to the receiving computer over the Public Service Telephone Network (PSTN);

(b) detection means at the receiving computer to detect it is being telephoned over PSTN, not answering the incoming call, and means therein for generating a control signal in response thereto;

(c) termination means at the originating computer to hang up (hook) the PSTN caller prior to incurring PSTN-related charges;

(d) controlled means at the receiving computer to automatically use a predetermined, generally unchanging phone number to dial-up the Internet in response to the signal generated in (b);

(e) Internet dial-up means at the originating computer to dial-up the Internet; and (f) means at one of the computers to generate signals to establish a data link over the Internet between the computers.

12. The system of claim 11 wherein the computers are general purpose digital computers and the means of (a)–(f) are incorporated in software programming.

13. The system of claim 11 wherein both of the computers are combinations of a fax machine and a stand-alone fax callback device connected to the fax machine, wherein the originating fax call-back device includes means (a) and (c) and (e) and (f) and the receiving fax call-back device includes means (b) and (d) and (f).

14. The system of claim 11 and including a plurality of receiving computers where at least one has the element (a) and at least a different one has the element (d).

15. The system of claim 11 wherein in (d) and (e) the computers dial-up the Internet.

16. A fax call-back device, which is adapted to connect to a device capable of transmitting or receiving a fax for establishing a data communication link over a dial-up network, to be performed automatically by the fax call-back device under program control, comprising a casing and within the casing:

(a) a port to receive a telephone line for connecting the fax call-back device to a fax machine;

(b) a second port for connecting the call-back device to the Public Service Telephone Network (PSTN);

(c) detection means to detect if the call-back device is being telephoned over PSTN and if the telephone call is hung up (hooked) prior to incurring PSTN-related charges, and means therein for generating a control signal in response thereto;

(d) controlled means to automatically dial-up a dial-up network in response to the signal generated in (c) using a predetermined, generally unchanging phone number; and (e) means to generate signals to the dial-up network to establish a data link thereon.

17. The call-back device of claim 16 and means to determine if an incoming call is from a normal fax machine or from a call-back device.

* * * * *